United States Patent [19]

Clark

[11] Patent Number: 5,481,999

[45] Date of Patent: Jan. 9, 1996

[54] TRAILER-MOUNTED BOAT COVER

[76] Inventor: James F. Clark, Rte. 2, Box 19, Amity, Ark. 71921

[21] Appl. No.: 372,574

[22] Filed: Jan. 13, 1995

[51] Int. Cl.⁶ .................................................... B63B 17/00
[52] U.S. Cl. .................... 114/361; 135/88.09; 150/166
[58] Field of Search ............................ 114/343, 361, 114/344; 296/136, 77.1; 150/166, 167; 135/88.09, 88.1

[56] References Cited

U.S. PATENT DOCUMENTS

| | | | |
|---|---|---|---|
| D. 336,064 | 6/1993 | Bogedin | D12/162 |
| 4,223,414 | 9/1980 | Dickson | 9/1.5 |
| 4,641,600 | 2/1987 | Halvorsen | 114/361 |
| 5,058,946 | 10/1991 | Faber | 296/181 |
| 5,076,195 | 12/1991 | Heyne | 114/361 |
| 5,228,408 | 7/1993 | Jannausch | 114/361 |
| 5,291,848 | 3/1994 | Wilhelm et al. | 114/361 |

*Primary Examiner*—Jesus D. Sotelo
*Attorney, Agent, or Firm*—Raymond L. Greene

[57] ABSTRACT

A boat cover device for attachment to the forward end of a boat trailer is provided. The cover has a rigid forward shield to which a flexible cover and support line are attached. The rigid forward shield provides protection from road debris during towing, provides an aerodynamic forward section which reduces flutter of the flexible cover and has a compartment for storage of the flexible cover when it is removed from the boat.

10 Claims, 4 Drawing Sheets

TRAILER-MOUNTED BOAT COVER

FIELD OF THE INVENTION

The invention is related to boat covers and in particular to boat covers attached to boat trailers.

BACKGROUND OF THE INVENTION

Various forms of boat covers, primarily flexible canvas and nylon covers are available for the protection of boat during travel or while stored outside. These covers require considerable maintenance, are time consuming both to install for travel or to remove for use of the boat. Also, when the cover is removed from the boat, a suitable place for storage is required, typically not available in a small boat. In addition, flexible covers must be braced from beneath by support arches in order to prevent water from collecting on the upper surfaces of the flexible covers. These covers, even when braced from beneath, are often unable to stand the weight of wet snow or ice. Additionally, during transport, flexible covers tend to lift off the boat and tend to flutter. These actions can cause scuffing of the boat finish or other damage. Also, debris kicked up from the highway may damage the forward portions of the boat whether or not a cover is in place. Accordingly, a need exists for a combination structure having a rigid-protective forward cover, flexible aft cover assembly and further having a storage space for the flexible aft cover.

SUMMARY OF THE INVENTION

Accordingly, it is an object of this invention to provide a protective boat cover attached to and stored with a boat trailer.

It is another object of the invention to provide a protective cover to shield the boat bow from road debris;

It is yet another object of the invention to provide a protective cover having improved aerodynamic characteristics and in particular having reduced flutter potential;

It is a further object of the invention to provide a protective boat cover which can be rapidly and easily installed or removed from a boat; and It is an object of this invention to provide a protective cover suitable for fitting to a variety of different-sized boats without modification of the cover.

The boat cover device of the present invention is a plywood and aluminum forward structure with an attached flexible aft cover. The forward structure is supported on the forward end of the trailer in a manner such that the bow of the boat fits snugly into the structure. The forward structure provides a protective hard cover which improves the aerodynamic effects of the cover, thereby reducing any flutter tendency. The forward structure also provides a physical shield against rock damage or other highway debris during towing. The forward structure also provides a storage compartment for the aft flexible cover once it is removed from the boat. The aft flexible cover has a support line extending above the boat from the forward structure to a position on the aft part of the boat. The support line in the preferred embodiment is a synthetic robe fabricated from nylon. The cover also has a drawstring along the lower edges so that it can be snugged to the hull of the boat. Installing and removing the cover is a quick and simple procedure requiring only the attachment or detachment of the support line and the sliding of the cover in or out of place. When the flexible cover is removed, it remains attached to the forward structure, where it is stored.

BRIEF DESCRIPTION OF THE DRAWINGS

The foregoing objects and other advantages of the present invention will be more fully understood from the following detailed description and reference to the appended drawings wherein.

DETAILED DESCRIPTION OF THE INVENTION

Figure 1:
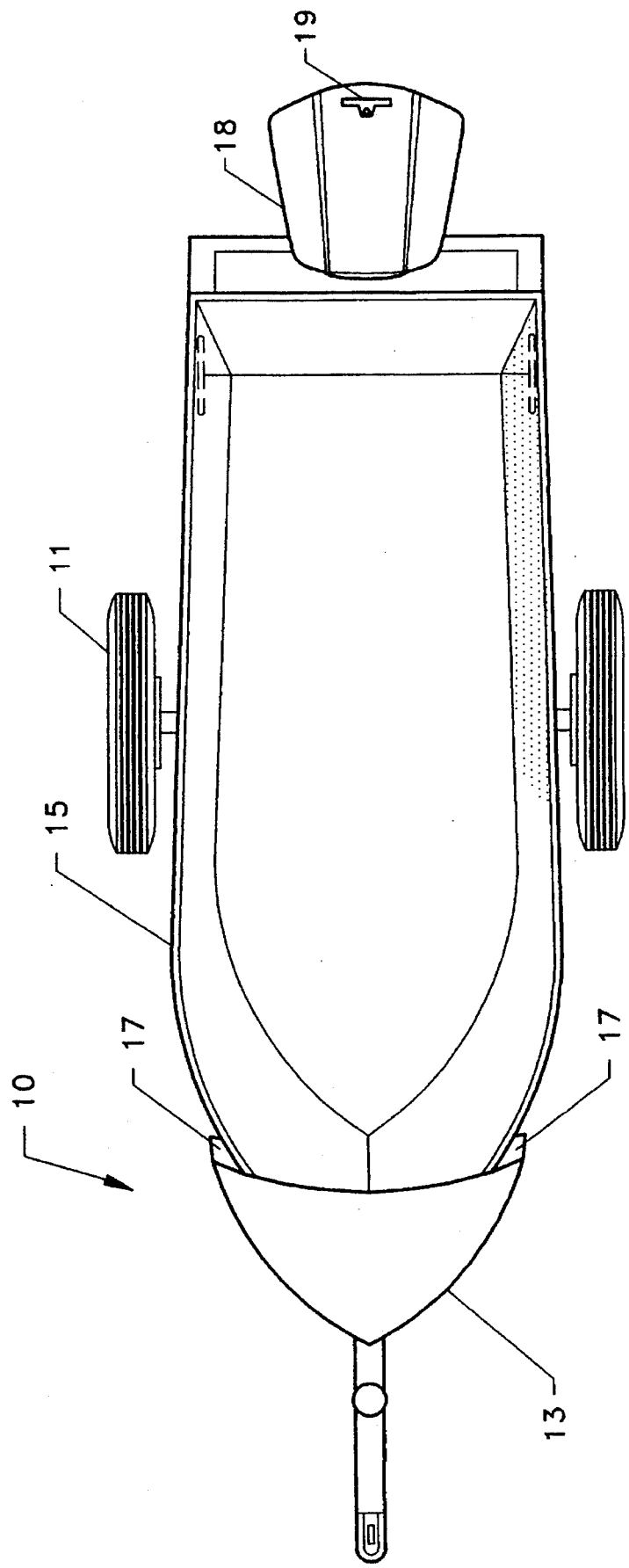
FIG. 1 is top view of the boat cover assembly installed on a boat.

Referring now to FIG. 1, the trailer-mounted boat cover of the present invention, designated generally by the reference numeral 10, is shown attached to a trailer 11. The rigid forward shield 13 provides an aerodynamically-shaped forward section which is permanently attached to trailer 11. A flexible cover is attached to and stows inside the compartment enclosed by shield 13. When the cover is in place covering boat 15, it extends aft from the forward shield through slots 17 on either side of the bow of the boat. An eyelet 19 is also provided attached to the existing handle or other structure of the outboard motor 18. The winch 16 used to load the boat 15 onto the trailer 11 is not a part of the invention, but is shown to depict a typical installation on a conventional trailer. Depending on the particular configuration of the winch assembly, the forward shield may be mounted on an extended strut above the winch.

Figure 2:
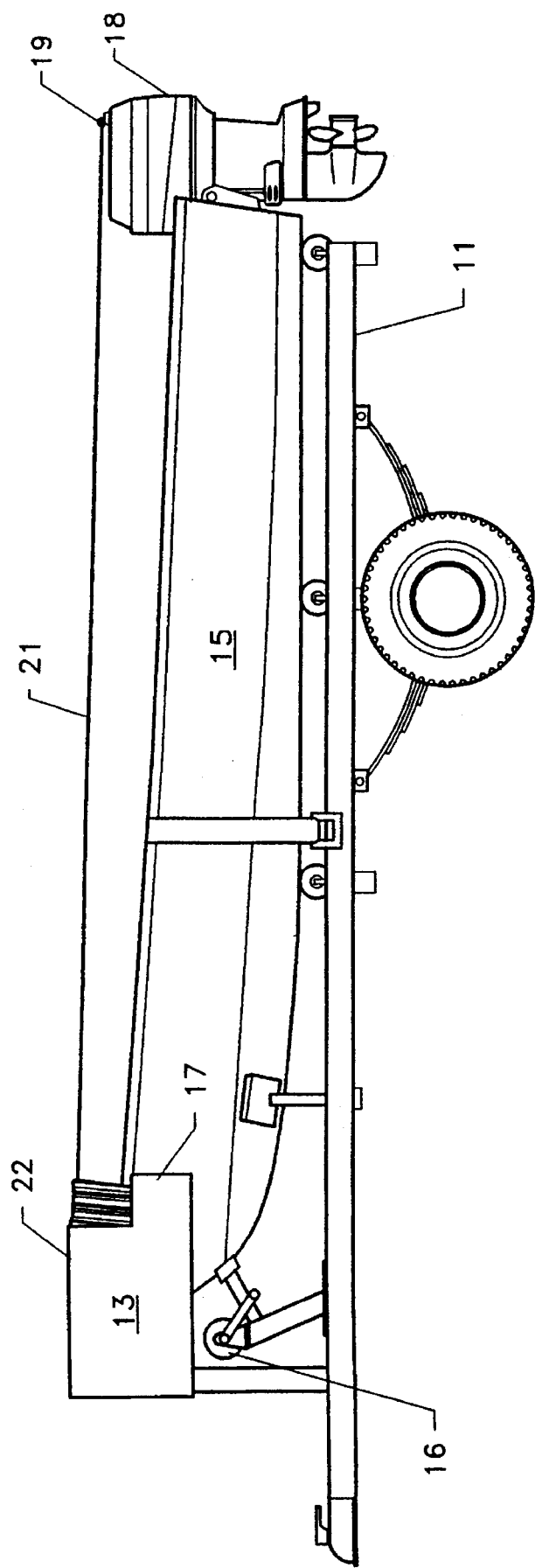
FIG. 2 is side view of the boat cover assembly installed on a boat.

As depicted in FIG. 2, eyelet 19 provides an attachment point for a support for the flexible cover. In this embodiment, a single support line 21 extends from the forward shield 13. Depending on the beam of the boat, more than one support line may be required to support the flexible cover. Adding additional support lines avoids the need for beamwise arch supports, commonly used with existing flexible covers. Flexible cover 22 is permanently attached to forward shield 13 and snaps down around the lower inside bow section of the storage compartment (shown in FIG. 3). In the preferred embodiment, the flexible cover 22 is fabricated from nylon cloth, however any flexible waterproof material may be substituted within the scope of the invention.

Figure 3:
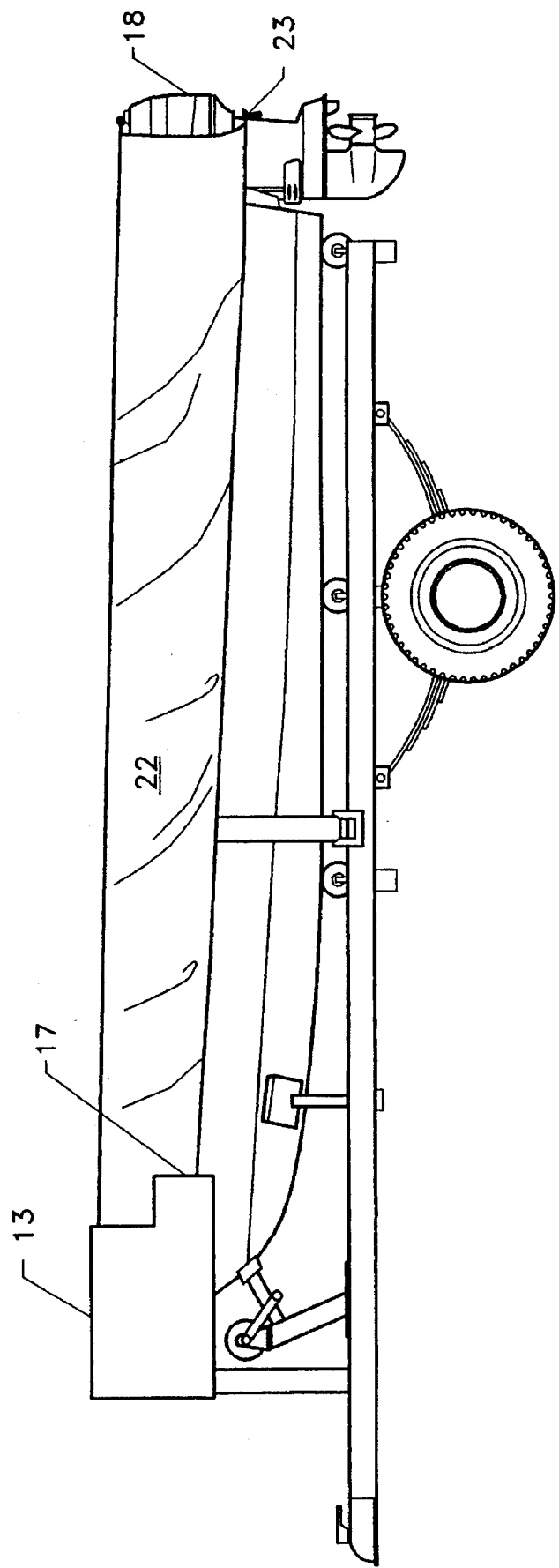
FIG. 3 is side view of the support lines and with flexible cover extended.

FIG. 3 depicts the flexible cover in the extended position, the lower leading edge extending through slots 17 on either side of the forward shield 13. A drawstring 23 extends along the lower edges of the flexible cover 22 and can be tied off to secure the cover behind outboard motor 18.

Figure 4:
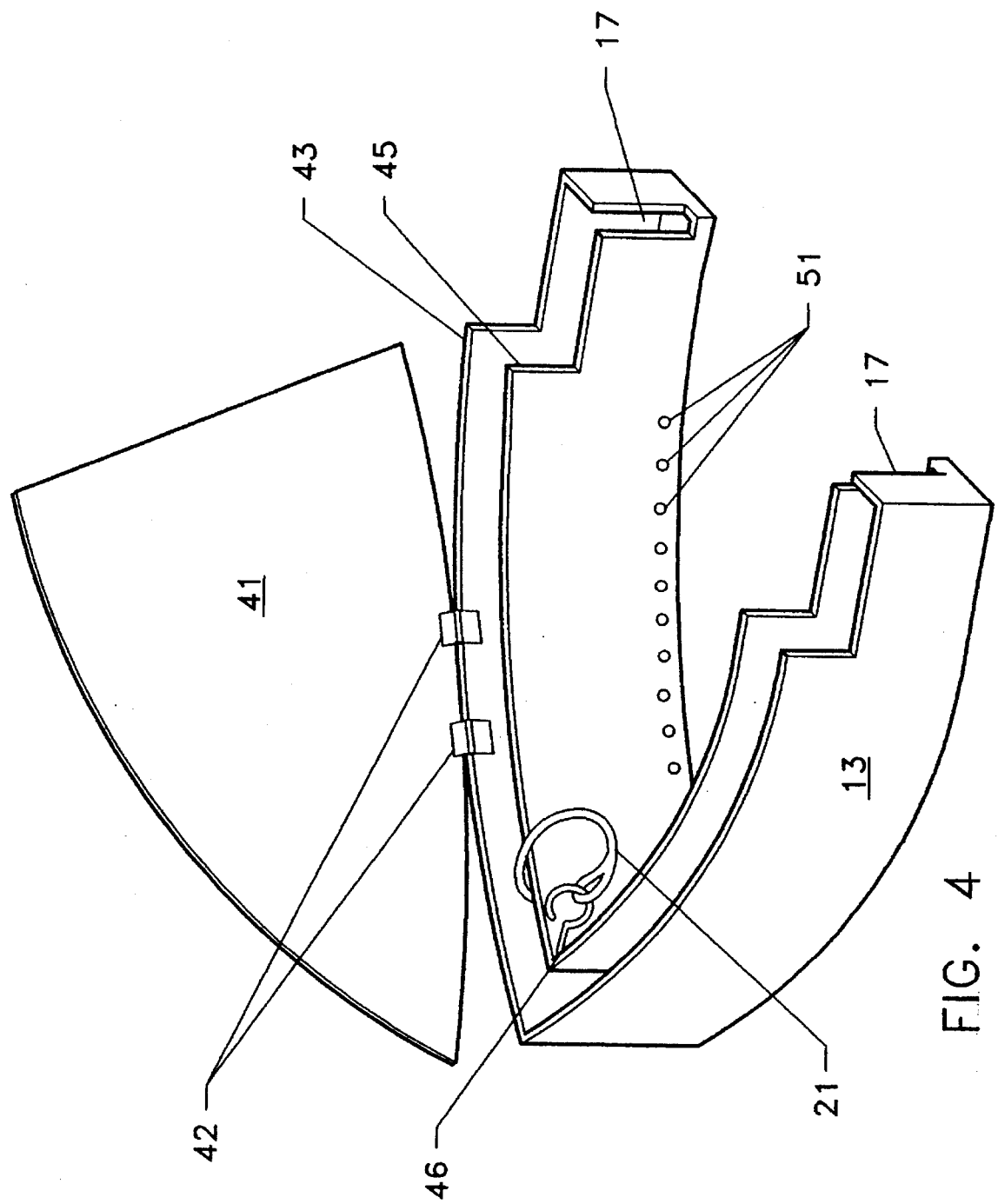
FIG. 4 is a perspective view of the hard cover or shield portion of the invention.

FIG. 4 depicts the assembly of the body of forward shield 13. The forward shield in the preferred embodiment is fabricated using a plastic upper cover and plywood for the sides and interior compartment. Any combination of materials resistant to water damage may be substituted. Top 41 is hinge-mounted by a series of hinges 42 located along one side of the forward shield. The shield forms a storage compartment between the outer wall 43 and the inner wall 45. An attachment point 46 allows the attachment of support line 21 which is shown stowed in the storage compartment. The flexible cover 22 (not shown in this figure) is also stowed, when not in use, in the storage compartment. The cover 22 (which is secured to snap connectors 51 riveted through inner wall 45) is snapped to connectors on the inside of the storage compartment. To install the cover on the boat, first the support line 21 is attached to a rear anchor point, such as the top of the motor. The cover is then drawn up and out of the storage compartment and pulled rearward to the stern of the boat. The cover edges exit the storage compartment through slots 17. The forward-most section of the cover 22 remains snapped to the inside of the storage compartment. The slots 17 allow the cover to fit snugly around the boat in the usual manner with the drawstring (shown in FIG. 3) to cinch up the lower edge. The entire assembly is permanently connected to the boat trailer 11, and the flexible cover always remains with the trailer. As with the flexible portion of the cover, the forward shield 13, is permanently affixed to the trailer. The shield 13 provides a hard cover against road debris, provides improved aerodynamics during highway travel and provides a storage compartment for the flexible cover and other small items needed for operation of the boat.

The features and advantage of the present invention are numerous. The combination of hard cover and soft cover provides a compact lightweight package while still providing hard cover protection at the bow of the boat. The permanent attachment of the hard cover shield to the trailer and the flexible cover to the shield eliminates the difficulties with attempting to carry the cover in the boat or find some other means of securing the cover. In the present invention, the cover combination is secured to the trailer and, in fact, the hard cover shield also acts as a storage compartment for the flexible cover. Additionally, the height of shield 13 allows the support line to provide the necessary slope to the flexible cover, thereby eliminating the need for arch supports across the boat. As a result, the cover of this invention may be installed or removed in approximately one minute.

Although the invention has been described relative to a specific embodiment thereof, there are numerous variations and modifications that will be readily apparent to those skilled in the art in the light of the above teachings. It is therefore to be understood that, within the scope of the appended claims, the invention may be practiced other than as specifically described.

What is claimed as new and desired to be secured by Letters Patent of the United States is:

1. A trailer-mounted boat cover comprising:

a rigid forward shield;

means for supporting a flexible cover attached to said rigid forward shield; and a flexible cover attached to said rigid forward shield and extending along and supported by said means for supporting.

2. A trailer-mounted boat cover as in claims 1 wherein said means for supporting comprises a plurality of support lines.

3. A trailer-mounted boat cover as in claim 2 wherein said plurality of support lines are synthetic ropes.

4. A trailer-mounted boat cover comprising;

a rigid forward shield;

a support line attached to said rigid forward shield; and a flexible cover attached to said rigid forward shield and supported by said support line.

5. A trailer-mounted boat cover as in claim 4 wherein said rigid forward shield comprises an aerodynamically-shaped cover having sides extending down the sides of a towed boat such sides having slots to allow extensions of said flexible cover therefrom.

6. A trailer-mounted boat cover as in claim 4 wherein said rigid forward shield further comprises a storage compartment suitable for storage of the flexible cover and support line.

7. A trailer-mounted boat cover as in claims 4 wherein said flexible cover has rear and side edges and has drawstring routed around its rear and side edges.

8. A trailer-mounted boat cover as in claim 4 wherein said rigid forward shield is fabricated from plywood.

9. A trailer-mounted boat cover as in claim 4 wherein said rigid forward shield is fabricated from plastic.

10. A trailer-mounted boat cover as in claim 4 wherein said flexible cover is a nylon cloth.

\* \* \* \* \*